(12) United States Patent
Sirbu Villa (10) Patent No.: US 11,904,488 B2
(45) Date of Patent: Feb. 20, 2024

(54) STIRRER DISPENSER FOR A BEVERAGE VENDING MACHINE

(71) Applicant: EVOCA S.P.A., Milan (IT)

(72) Inventor: Dan Alexie Sirbu Villa, Milan (IT)

(73) Assignee: EVOCA S.P.A., Milan (IT)

( * ) Notice: Subject to any disclaimer, the term of this patent is extended or adjusted under 35 U.S.C. 154(b) by 93 days.

(21) Appl. No.: 17/594,691

(22) PCT Filed: Apr. 30, 2020

(86) PCT No.: PCT/IB2020/054097
§ 371 (c)(1),
(2) Date: Oct. 26, 2021

(87) PCT Pub. No.: WO2020/225669
PCT Pub. Date: Nov. 12, 2020

(65) Prior Publication Data
US 2022/0203567 A1    Jun. 30, 2022

(30) Foreign Application Priority Data

May 3, 2019    (EP) .................................... 19172645
Jul. 26, 2019    (IT) ....................... 102019000013083

(51) Int. Cl.
*B26D 1/08*    (2006.01)
*B29C 53/06*    (2006.01)
(Continued)

(52) U.S. Cl.
CPC ............ *B26D 1/085* (2013.01); *B29C 53/063* (2013.01); *G07F 11/70* (2013.01); *G07F 13/10* (2013.01); *B29C 2793/0027* (2013.01)

(58) Field of Classification Search
CPC ...... B26D 1/085; B26D 5/086; B29C 53/063; B29C 2793/0027; B29C 2793/009;
(Continued)

(56) References Cited

U.S. PATENT DOCUMENTS 4,725,218 A    2/1988  Timmons et al.
5,381,925 A *  1/1995  Cervantes ................. A47F 1/10
                                                                221/202
(Continued)

FOREIGN PATENT DOCUMENTS

EP    1586254 A1    10/2005
EP    2006074 A1    12/2008
(Continued)

OTHER PUBLICATIONS www.xiaohai-machine.com: "Paper Stick Making Machine", Youtube, Jul. 11, 2015, Retrieved from the Internet: URL: https://www.youtube.com/watch?v=JUUG4aF2gbQ.
(Continued)

*Primary Examiner* — Seung H Lee
(74) *Attorney, Agent, or Firm* — Dorsey & Whitney LLP (57) ABSTRACT

A beverage vending machine with a stirrer dispenser configured to form and dispense disposable stirrers from a strip made of food-grade material, preferably biodegradable or compostable and preferably plastic-free and waterproof. The stirrer dispenser comprises a detaching device configured either to detach, or to allow manual detachment of, an end piece of the strip with such a length as to be usable as a stirrer.

12 Claims, 6 Drawing Sheets

(51) Int. Cl.
*G07F 11/70* (2006.01)
*G07F 13/10* (2006.01)

(58) Field of Classification Search
CPC ......... B29C 53/06; G07F 11/70; G07F 13/10; B31D 5/0091; B31F 1/0019
See application file for complete search history.

(56) References Cited

U.S. PATENT DOCUMENTS

| | | | |
|---|---|---|---|
| 9,113,729 B2* | 8/2015 | Righetti | A47F 1/10 |
| 10,354,477 B2* | 7/2019 | Magno | G07F 13/10 |
| 10,531,770 B2* | 1/2020 | Case | B65H 31/3009 |
| 2006/0199719 A1 | 9/2006 | White et al. | |
| 2008/0128445 A1* | 6/2008 | Huang | G07F 11/04 |
| | | | 221/7 |

FOREIGN PATENT DOCUMENTS

| | | |
|---|---|---|
| EP | 2563187 A1 | 3/2013 |
| GB | 1021651 A | 3/1966 |

OTHER PUBLICATIONS

International Search Report and Written Opinion dated Jul. 7, 2020 as received in Int'l App. No. PCT/IB2020/054097.
Demand and Reply to Written Opinion filed Mar. 3, 2021 as filed in Int'l App. No. PCT/IB2020/054097.
Written Opinion of the International Preliminary Examining Authority dated Apr. 20, 2021 as received in Int'l App. No. PCT/IB2020/054097.
Reply to Written Opinion filed Jun. 17, 2021 as received in Int'l App. No. PCT/IB2020/054097.
International Preliminary Report on Patentability dated Jul. 23, 2021 as received in Int'l App. No. PCT/IB2020/054097.

* cited by examiner

STIRRER DISPENSER FOR A BEVERAGE VENDING MACHINE

CROSS-REFERENCE TO RELATED APPLICATIONS

This patent application is a U.S. National Stage of PCT International Application No. PCT/IB2020/054097 filed on 30 Apr. 2020, which claims priority to European Patent Application No. 19172645.4 filed on 3 May 2019 and Italian Patent Application No. 102019000013083 filed on 26 Jul. 2019.

TECHNICAL FIELD OF THE INVENTION

The present invention relates to a beverage vending machine with a stirrer dispenser.

PRIOR ART

In the vending sector, it is known to equip a beverage vending machine with a stirrer dispenser controlled by an electronic control unit of the vending machine to dispense a stirrer in a cup arranged in a filling station to receive a beverage. The stirrer is normally dispensed in the cup before this is filled with the beverage and the dispensing of the stirrer may be made subject to a user request for sugar in the selected beverage.

Currently, the stirrers used in vending machines are formed from plastic and the known stirrer dispensers comprise, in general, a storage containing one or more columns of stacked stirrers and an extractor reciprocatingly movable transverse to the stirrers at an outlet of the storage to cause a forward motion to result in a stirrer being released from the bottom of the stack and falling into the cup either directly or via a slide.

A stirrer dispenser of this type is described, for example, in EP 1 586 254 A1.

The growing attention to the problem of environmental pollution, which recently led the European Union to ban disposable plastic so as to prohibit, as of 2021, the sale of articles made of disposable plastic, such as plates, cutlery, cups, straws and stirrers for beverages, has pushed many producers in the vending sector to look for alternative "ecological" solutions to the products currently used.

As far as stirrers are concerned, wood stirrers have been proposed.

Although wood certainly represents a more ecological solution compared to plastic, in practice its use in automatic vending, inter alia, nevertheless entails various problems as the result of which, currently, a certain skepticism of operators in the industry remains regarding this material.

First of all, as a matter of fact, it is a widespread opinion that wood stirrers are indeed not an ecological and sustainable alternative due to the consumption of the raw material that their production would entail and many doubts also exist regarding the suitability of wood in the natural state from a hygienic point of view considering that, in order to be biodegradable, it cannot be treated.

As far as stirrer dispensers are concerned, the substitution of plastic stirrers with wood stirrers gives rise to various problems stemming from the fact that the fibre of natural wood tends to expand with the humidity present inside the vending machine, rendering the surface of the stirrers rough, which, as they are unable to slide on top of each other, can cause the disruption and sometimes the blocking of the stirrer dispenser.

Besides these problems relating to the material which the stirrers are made of, a further problem is perceived in the stirrer dispenser sector which arises from the need to adapt the supply of this type of product to an ever wider, more varied and personalized offer of state-of-the-art vending machines. In particular, the need is felt for dispensing stirrers of different lengths, avoiding, for cost and size reasons, an increase in the number of stirrer dispensers inside the vending machine.

SUBJECT MATTER AND SUMMARY OF THE INVENTION

The object of the present invention is to provide a beverage vending machine with a stirrer dispenser which is associable with the beverage vending machine and which represents an ecological, economical and extremely flexible alternative and adaptable to the requirements pertaining to the solutions currently on the market.

In accordance with the present invention, a beverage vending machine with a stirrer dispenser is provided, as claimed in the appended claims.

BRIEF DESCRIPTION OF THE DRAWINGS

The invention will now be described with reference to the attached drawings, which illustrate a non-limiting embodiment of the invention, wherein.

DETAILED DESCRIPTION OF PREFERRED EMBODIMENTS OF THE INVENTION

The present invention will now be described in detail with reference to the attached Figures in order to allow a person skilled in the art to realize and to use the same. Various modifications to the described embodiments will be immediately evident to those skilled in the art and the general principles described can be applied to other embodiments and applications without abandoning the protective scope of the present invention, as defined in the appended claims. Therefore, the present invention must not be considered limited to the embodiments described and illustrated, but it must be granted the broadest protective scope in accordance with the principles and characteristics described and claimed herein.

Figure 1:
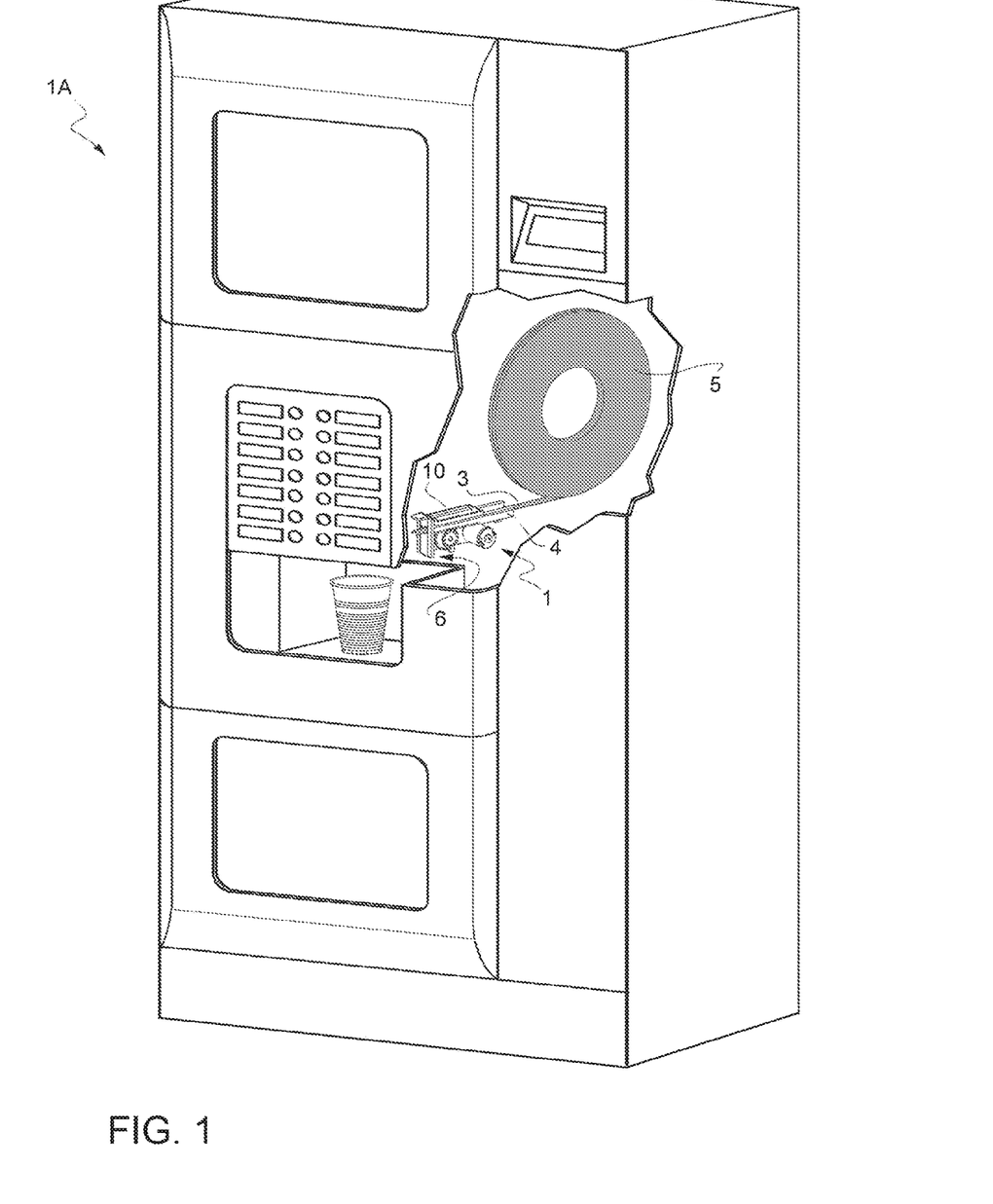
FIG. 1 is a perspective view of a preferred embodiment of a vending machine with a stirrer dispenser according to the invention.

In FIG. 1, reference numeral 1A references as a whole a beverage vending machine.

The beverage vending machine 1 has the general shape of a wardrobe closed at the front by a door and is provided, on said door, with a beverage selection interface and with a cup withdrawal compartment accessible from the outside to allow a user to withdraw a cup containing a selected beverage.

The beverage vending machine 1A is additionally provided with a stirrer dispenser 1 configured to form and dispense disposable stirrers 2 from a flat strip 3 of ecological food-grade material, preferably biodegradable or compostable and preferably plastic-free, for instance waterproof cardboard.

In the embodiment shown in FIG. 1, the stirrer dispenser 1 is arranged inside the beverage vending machine 1A and is controllable by an electronic control unit of the beverage vending machine to automatically dispense, during a beverage preparation process, a stirrer 2 directly into a cup previously arranged in a withdrawal compartment to receive the beverage selected by a user. The electronic control unit may be programmed to operate the stirrer dispenser 1 to dispense a stirrer 2 every time a beverage is selected or when a given quantity of sugar in the selected beverage is requested by the user or, independently of a request for sugar, depending on the type of beverage selected, such as in the case of soluble beverages.

As an alternative to what described above, the stirrer dispenser 1 may be arranged in the beverage vending machine to be operated, in response to a specific user selection, to dispense a stirrer 2 only, independently of the beverage request. In this case, the stirrer dispenser 2 is arranged such that the stirrer 2 is dispensed inside a dedicated stirrer withdrawal area, separate from or contiguous to the cup withdrawal compartment, and accessible to the user from the outside.

In a different configuration not shown, the stirrer dispenser 1 may be distinct from, and externally associated with, the beverage vending machine 1A so as to constitute an independent device that is operable by a user independently of the beverage vending machine 1A in order to dispense a stirrer 2 when requested.

In the embodiment shown in the figures, the stirrer dispenser 1 is conveniently electronically controlled by the electronic control unit of the beverage vending machine 1A to dispense stirrers 2 of different lengths depending on the size of the cup that is selected by the electronic control unit to receive the beverage selected by the user.

Figure 2:
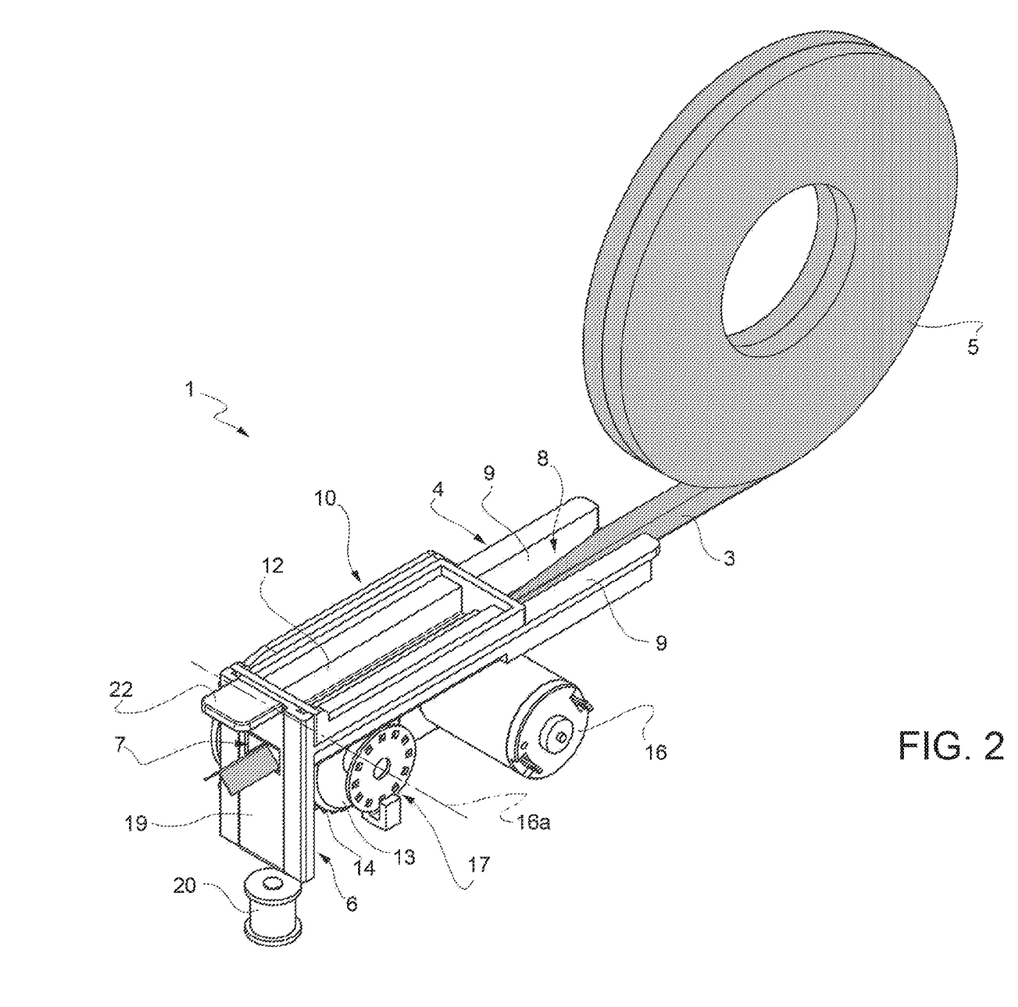
FIG. 2 is a perspective view of the stirrer dispenser shown in FIG. 1.

As shown in FIG. 2, the stirrer dispenser 1 comprises a feeding channel 4, which is slidably engaged, in a feeding direction D (indicated in FIGS. 3 and 4 by an arrow), by an end portion of the strip 3, which, during operation, is unwound from a storage in the form of a roll 5.

According to variants not shown, the strip 3 may be stored in manners and forms different from a roll; for example, the strip 3 may be folded to form a bellow or with other folding methods which allow the achievement of a compact storage.

The stirrer dispenser 1 further comprises a detaching device 6 associated with the feeding channel 4 to form a transverse detachment line on the strip 3, at a predetermined distance from the free end of the strip 3, which transverse detachment line defines, on the strip 3, an end piece of a given length forming a stirrer 2.

In a preferred embodiment, the detaching device 6 is configured to form a complete transverse detachment line, i.e., to cut the strip 3 transversely. In this embodiment, the detaching device 6 is preferably arranged at an outlet 7 of the feeding channel 4 such that, when the stirrer 2 is detached from the rest of the strip 3, the stirrer 2 is already arranged outside the feeding channel 4 and is free to fall by gravity, either directly or via a slide, into the cup arranged in the cup withdrawal compartment or in the stirrer withdrawal area for manual withdrawal by the user.

In a variant, usable in those configurations in which the stirrers 2 are not dispensed directly into a cup but are manually withdrawn by the users from the stirrer withdrawal area, the detaching device 6 may be configured to form an uncompleted transverse detachment line on the strip 3, i.e., to form a weakened or incision line or a perforated or pre-cut line so as to allow a user to manually detach the stirrer 2 from the rest of the strip 3 by simply pulling the stirrer 2. In this embodiment, the detaching device 6 may be arranged at or upstream from the outlet 7 such that at least a portion of the stirrer 2 protrudes out of the outlet 7 into the stirrer withdrawal area and allows a user to grasp and detach the stirrer 2.

The feeding channel 4 comprises an inlet portion 8 along which the strip 3 is advanced in a flat configuration while being guided laterally by two lateral walls 9 of the feeding channel 4.

Preferably, the feeding channel 4 further comprises a bending portion 10, which is arranged between the inlet portion 8 and the outlet 7 and has the function of bending the strip 3 longitudinally, while the latter advances toward the outlet 7, so as to give the stirrers 2 a more rigid and more manageable shape.

Figure 3:
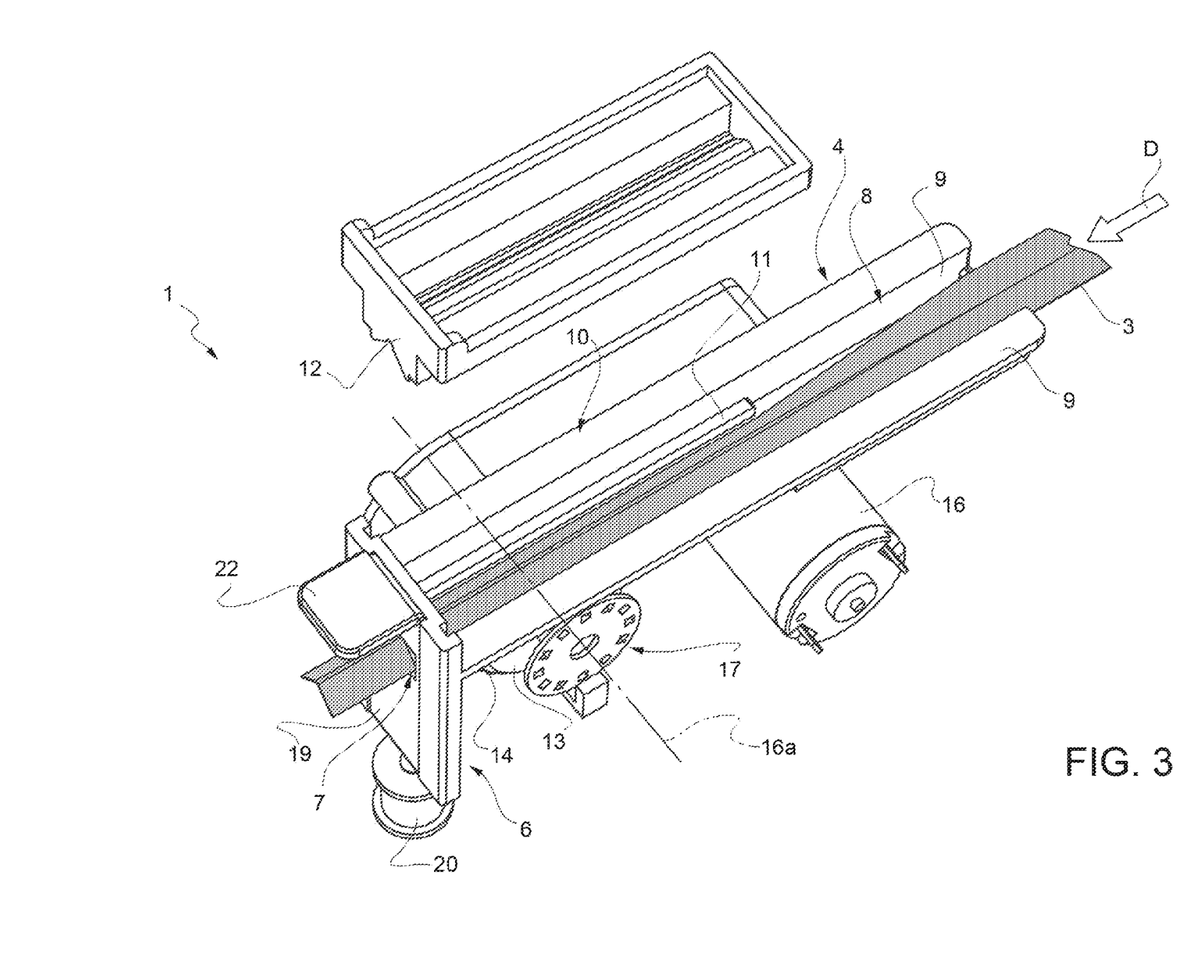
FIG. 3 is an exploded view of the stirrer dispenser of FIG. 2.
Figure 4:
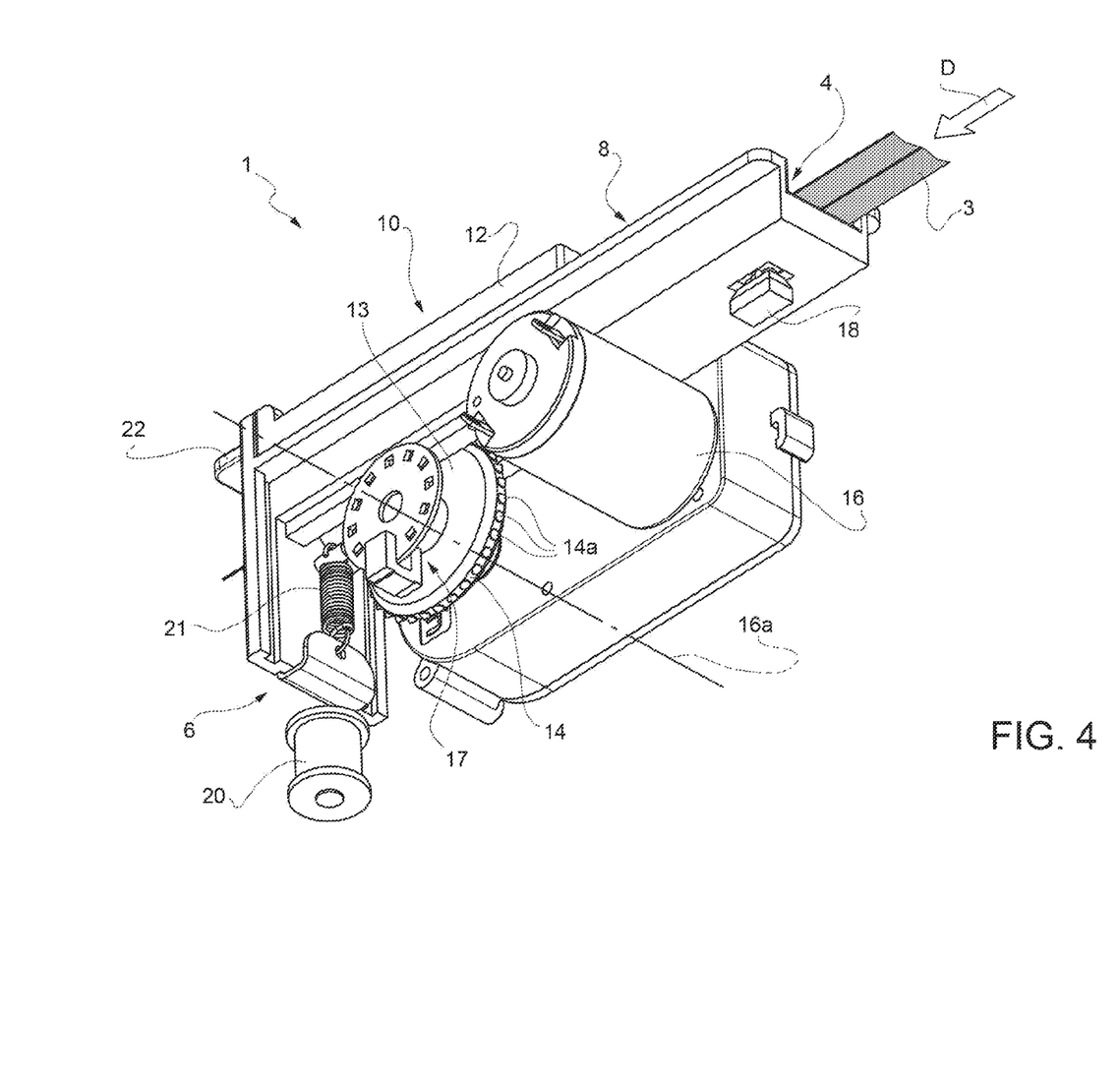
FIG. 4 is a perspective view from the bottom of the stirrer dispenser of FIG. 2.
Figure 5:
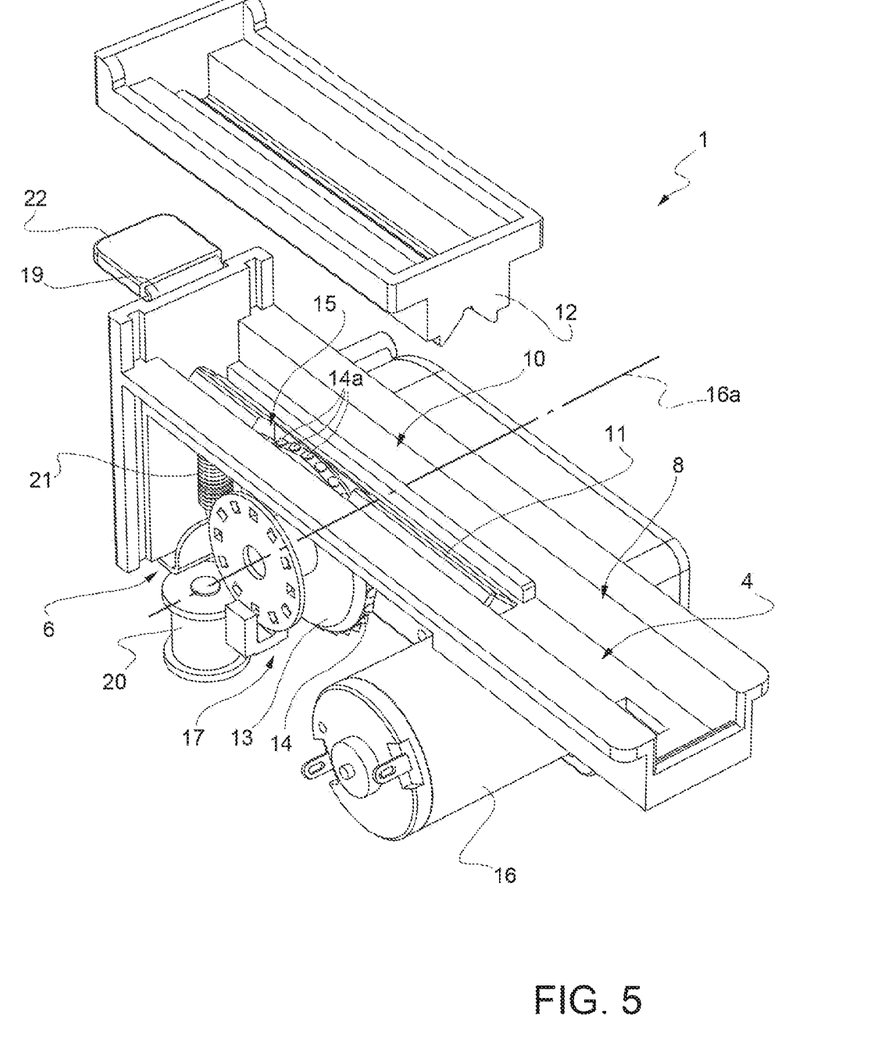
FIG. 5 is an exploded view of the stirrer dispenser of FIG. 2 without the material for forming the stirrers.
Figure 6:
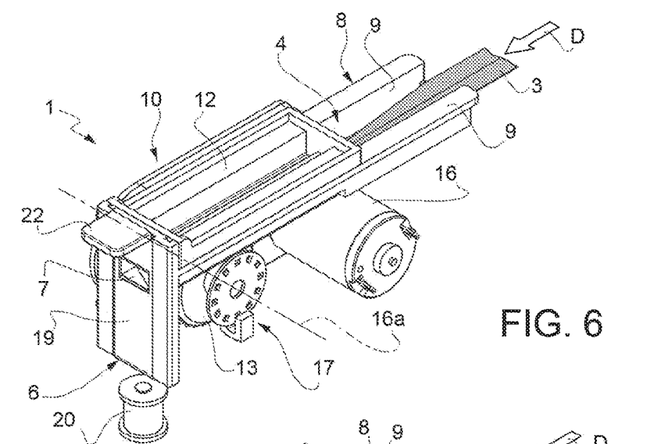
FIGS. 6, 7 and 8 illustrate a working sequence of the stirrer dispenser of FIG. 2.
Figure 7:
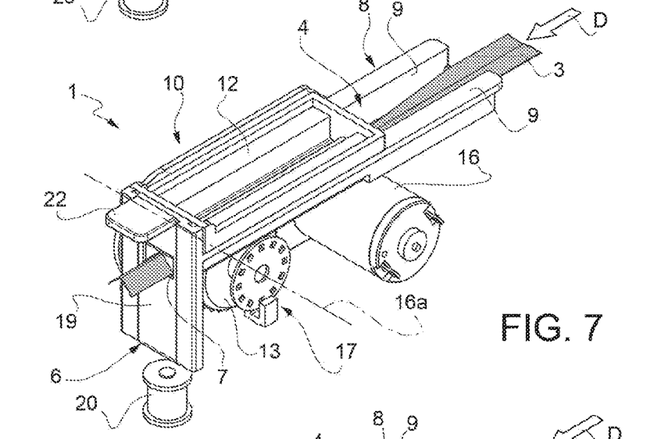
Figure 8:
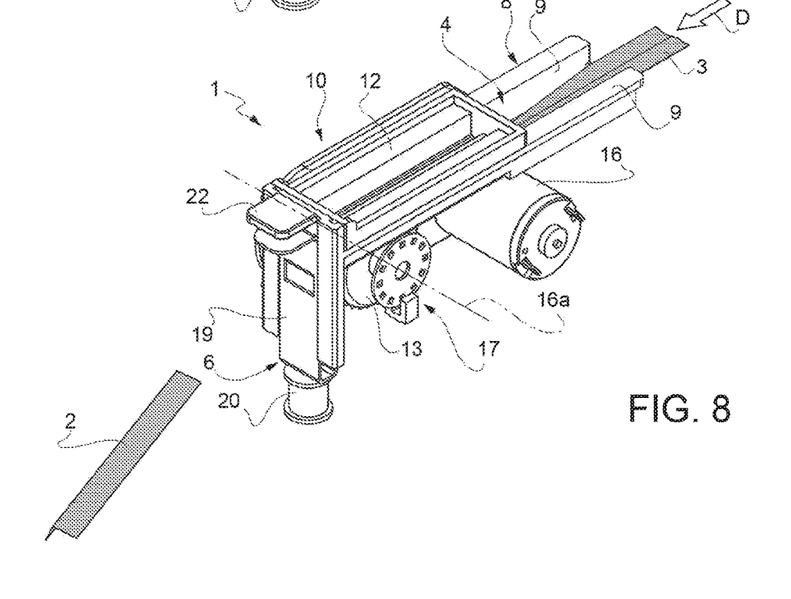

As shown in FIGS. 3 and 5, the bending portion 10 is formed by two benders 11 and 12, which have respective shaping profiles and are mutually coupled so as to define a passage extending in the feeding direction D and having a cross-section of a given shape so as to shape the strip 3 longitudinally, when it is advanced through the passage, in accordance with said given shape. In the example shown in the figures, the shaping profiles of the benders 11 and 12 are such as to give the strip 2 an L-shaped cross-section; however, any other shape that is fit for the purpose may be used, for example a V, U or C shape.

As shown in FIG. 5, the bender 11 comprises a wedge-shaped member having an apex edge extending in the feeding direction D, and the bender 12 has a longitudinal groove with a shape complementary to the wedge-shaped member and coupled thereto to form a passage therebetween with a height equal to the thickness of the strip 3 and adapted to be slidably engaged by the strip 3.

Preferably, in order to facilitate the longitudinal bending of the strip 3, a strip 3 with a longitudinal weakened line is used (FIGS. 2, 3, 6-8), which is formed on the strip 3 in such a way as to be arranged, when the strip 3 passes through the bending portion 10, at the apex edge of the bender 11 so as to ensure that the strip 3 is bent exactly along the longitudinal weakened line.

In the example shown in the attached figures, one of the two benders, referenced by reference numeral 11, is mounted in a fixed manner and is integral with the feeding channel 4, while the bender 12 is removably coupled to the bender 11 to allow an operator either to remove it for maintenance (FIG. 3) or to position the initial end of the strip 3 along the feeding channel 4 during replacement of the roll 5, The strip 3 is conveniently fed along the feeding channel 4 by a feeding device 13.

In a preferred embodiment, the feeding device 13 comprises a dragging wheel 13, which lies on a plane parallel to the feeding direction D of the strip 3 along the feeding channel 4 and is arranged underneath the feeding channel 4 with one of its peripheral edges 14 substantially tangent to the feeding channel 4 in such a manner as to extend through an aperture 15 made through the feeding channel 4. Preferably, the feeding direction D is horizontal and the dragging wheel 13 lies on a vertical plane.

Conveniently, the peripheral edge 14 of the dragging wheel 13 is provided with small sharp teeth 14a which protrude, through the aperture 15, towards the feeding channel 4 far enough to penetrate, when the dragging wheel 13 turns and the strip 3 is advanced along the feeding channel 4, the lower surface of the strip 3 so as to impart to the strip 3 a dragging motion in the feeding direction D.

Preferably, the aperture 15 is formed at the bending portion 10 of the feeding channel 4. This arrangement is particularly advantageous inasmuch as, in this case, the dragging wheel is arranged below the bender 12 which thus opposes the thrust imparted by the teeth 14*a* to the strip 3, so resulting not only in a more efficient dragging action on the strip 3 being, but, above all, in an enduring longitudinal bending of the strip 3.

In a variant not shown, the teeth 14*a* may be replaced with small rollers or other dragging mechanisms capable of bringing about a dragging motion of the strip 3 in the feeding direction D by penetration, by suction, by friction or in any other suitable way.

The dragging wheel 13 is conveniently driven by an electric motor 16 to rotate about an axis 16*a* transverse to the feeding direction D of the strip 3, in a direction of rotation concordant with the feeding direction D.

The dragging wheel 13 is conveniently provided with an angular position sensor 17 in the form of a rotary encoder associated with the axis 16*a* and electrically connected to an electronic control unit of the beverage vending machine 1A to control the feeding of the strip 3 and, thus, the length of the stirrer 2 to be dispensed.

The presence of the strip 3 on the feeding channel 4 is detected by means of a presence or proximity sensor 18 arranged at the inlet portion of the feeding channel 4.

In the embodiment shown in FIGS. 2, 4, 6 and 8, the detaching device 6 conveniently comprises a reciprocating blade 19 arranged before the outlet 7 to reciprocate in a direction transverse to the feeding direction D between a rest position (FIG. 6), in which the blade 19 leaves the outlet 7 free, and a cutting position (FIG. 8), in which the blade 19 extends through the outlet 7 and cuts the piece of strip 3 protruding from the outlet 7 to form a stirrer 2.

In a preferred embodiment, the blade 19 is caused to reciprocate by the electronic control unit by means of an electromagnet 20, which, when electrically energised, attracts the blade 19 and move it from the rest position to the cutting position against the bias of a return spring 21, which is arranged to cause the blade 19 to move back into the rest position when the electromagnet is electrically de-energised.

Other actuating devices may be used to move the blade 19. In a variant, a single electric motor may be used to operate the dragging wheel 13 and the detaching device 6.

The blade 19 is further provided, at ad end thereof, with a lever 22 to allow an operator, during replacement of the roll 5, to operate the blade 19 manually and remove the end of the strip 3 after positioning it in the feeding channel 4.

The invention claimed is:

1. A stirrer dispenser adapted to be either arranged side to or integrated in a beverage vending machine to dispense single disposable stirrers on demand in response to either a request for a stirrer from a user or a beverage selection by a user; the stirrer dispenser being adapted to form and dispense disposable stirrers from a strip made of food-grade material, the stirrer dispenser comprising:

a feeding channel adapted to feed the strip along a feeding direction towards an outlet of the stirrer dispenser and comprising a feeding device associated with the feeding channel and adapted to engage the strip to impart to the strip a thrust in the feeding direction; and a detaching device configured either to detach an end piece of the strip with such a length as to be usable as a stirrer or to allow an end piece of the strip with such a length as to be usable as a stirrer to be manually detached from the strip.

2. The stirrer dispenser of claim 1, wherein the detaching device is configured to form on the strip a weakened line adapted to allow manual detachment of an end piece of the strip with such a length as to form a stirrer.

3. The stirrer dispenser of claim 1, wherein the feeding channel comprises a bending portion arranged upstream from the outlet in the feeding direction and configured to longitudinally bend the strip during feeding towards the outlet, so as to give the stirrers a determined cross-section.

4. The stirrer dispenser of claim 3, wherein the determined cross-section is L-shaped or V-shaped.

5. The stirrer dispenser of claim 3, wherein the feeding channel is adapted to receive the strip in a flat configuration, and the bending portion comprises two benders having complementary shaping profiles which are mutually coupled to define therebetween a passage with a determined cross-section and adapted to be crossed by the strip when it is fed in the feeding direction.

6. The stirrer dispenser of claim 5, wherein one of the two benders is defined by a wedge-shaped member having an apex edge extending in the feeding direction, and the other bender has a longitudinal groove with a shape complementary to the wedge-shaped member and coupled thereto in such a way as to form therebetween a passage with a height equal to the thickness of the strip and adapted to be slidably engaged by the strip.

7. The stirrer dispenser of claim 5, wherein the feeding device is arranged at the bending portion and is configured to cooperate with the bending portion so as to impart to the strip, in addition to a thrust in the feeding direction, also a thrust transverse to the feeding direction so as to press the strip in said passage and facilitate the bending of the strip.

8. The stirrer dispenser of claim 1, wherein the feeding device is designed to drag the strip by a penetration-, friction-, or suction-based engagement.

9. The stirrer dispenser of claim 1, wherein the feeding device comprises a power drive wheel having a peripheral edge arranged tangentially to the feeding channel and provided with tips configured to protrude in the feeding channel to engage, when the power drive wheel rotates and the strip is fed along the feeding channel, a surface of the strip so as to impart to the strip a drag action in the feeding direction.

10. The stirrer dispenser of claim 1, wherein the detaching device comprises a reciprocating blade operable to reciprocate in a direction transverse to the feeding direction.

11. The stirrer dispenser of claim 1, wherein the strip made of food-grade material is made of biodegradable or compostable and plastic-free and waterproof material.

12. A beverage vending machine comprising the stirrer dispenser of claim 1, and an electronic control unit connected to the stirrer dispenser and configured to operate the stirrer dispenser to form stirrers of different lengths depending on the type of cup into which the beverage is to be dispensed.

* * * * *